(12) United States Patent
Bushnell et al.

(10) Patent No.: US 10,613,666 B2
(45) Date of Patent: Apr. 7, 2020

(54) CONTENT CREATION USING ELECTRONIC INPUT DEVICE ON NON-ELECTRONIC SURFACES

(71) Applicant: Apple Inc., Cupertino, CA (US)

(72) Inventors: Tyler S. Bushnell, Mountain View, CA (US); Steven Cardinali, Campbell, CA (US); Katherine E. Tong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/650,512

(22) Filed: Jul. 14, 2017

(65) Prior Publication Data
US 2018/0018057 A1 Jan. 18, 2018

Related U.S. Application Data

(60) Provisional application No. 62/363,172, filed on Jul. 15, 2016.

(51) Int. Cl.
*G06F 3/041* (2006.01)
*G06F 3/01* (2006.01)
(Continued)

(52) U.S. Cl.
CPC .......... *G06F 3/0414* (2013.01); *G06F 3/017* (2013.01); *G06F 3/0346* (2013.01);
(Continued)

(58) Field of Classification Search
CPC .................. G06F 3/03545; G06F 3/03543
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 1659505 A 8/2005
CN 103353793 A 10/2013
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Chad M Dicke
(74) *Attorney, Agent, or Firm* — Kubota & Basol LLP

(57) ABSTRACT

Content can be using an input device without a touch-sensitive surface. In some examples, touch-down and lift-off on a non-touch-sensitive surface can be monitored by a force sensor of the input device. The position and/or motion of the input device can be tracked according to various methods including one or more of a motion and orientation sensor, a camera, or an electromagnetic- or sound-based triangulation scheme. The force data and position/motion data can be processed to generate content, including textual character input and three-dimensional objects. In some examples, the content can be generated based on tracking position and/or motion of the input device without requiring contact with a surface.

23 Claims, 9 Drawing Sheets

(51) Int. Cl.
  *G06F 3/0488* (2013.01)
  *G06F 3/0346* (2013.01)
  *G06F 3/043* (2006.01)
  *G06F 3/0354* (2013.01)
  *G06F 3/046* (2006.01)
  *G06F 3/048* (2013.01)

(52) U.S. Cl.
  CPC .......... *G06F 3/03545* (2013.01); *G06F 3/043* (2013.01); *G06F 3/046* (2013.01); *G06F 3/048* (2013.01); *G06F 3/0412* (2013.01); *G06F 3/0488* (2013.01)

(58) Field of Classification Search
  USPC ..................... 345/179–183; 178/19.01–19.07
  See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,212,296 B1* | 4/2001 | Stork | G06F 3/03545 178/19.01 |
| 6,310,610 B1 | 10/2001 | Beaton et al. | |
| 6,323,846 B1 | 11/2001 | Westerman et al. | |
| 6,348,914 B1* | 2/2002 | Tuli | G06F 3/03545 345/158 |
| 6,441,807 B1* | 8/2002 | Yamaguchi | G06F 3/0414 178/18.01 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,268,774 B2 | 9/2007 | Pittel et al. | |
| 7,646,379 B1 | 1/2010 | Drennan et al. | |
| 7,663,607 B2 | 2/2010 | Hotelling et al. | |
| 7,852,318 B2* | 12/2010 | Altman | G01S 11/16 178/19.02 |
| 7,880,726 B2* | 2/2011 | Nakadaira | G06F 3/04815 345/156 |
| 8,456,419 B2* | 6/2013 | Wilson | G06F 3/0346 178/19.05 |
| 8,479,122 B2 | 7/2013 | Hotelling et al. | |
| 8,624,859 B2* | 1/2014 | Aono | G06F 3/0414 178/18.03 |
| 8,922,530 B2 | 12/2014 | Pance | |
| 9,262,033 B2 | 2/2016 | Idzik et al. | |
| 2004/0150631 A1* | 8/2004 | Fleck | G06F 3/03545 345/179 |
| 2004/0189620 A1* | 9/2004 | Roh | G06F 3/03545 345/179 |
| 2004/0239702 A1* | 12/2004 | Kang | G06F 3/03545 715/863 |
| 2005/0150697 A1* | 7/2005 | Altman | G06F 3/011 178/19.02 |
| 2006/0197753 A1 | 9/2006 | Hotelling | |
| 2007/0003168 A1* | 1/2007 | Oliver | G06F 3/03545 382/314 |
| 2007/0107744 A1* | 5/2007 | Dilbeck, Jr. | G06T 19/00 132/56 |
| 2008/0018591 A1 | 1/2008 | Pittel et al. | |
| 2012/0280948 A1* | 11/2012 | Barrus | G06F 3/04883 345/179 |
| 2014/0327658 A1* | 11/2014 | Vardi | G06K 9/222 345/179 |
| 2015/0160851 A1* | 6/2015 | Michihata | G06F 3/04883 345/174 |
| 2017/0309057 A1* | 10/2017 | Vaganov | H04N 13/30 |
| 2017/0358144 A1* | 12/2017 | Schwarz | G06F 3/013 |

FOREIGN PATENT DOCUMENTS

| | | |
|---|---|---|
| CN | 105378585 A | 3/2016 |
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Office Action received for Chinese Patent Application No. 201710572488.9, dated Nov. 18, 2019, 24 pages (12 pages of English Translation and 12 pages of Official copy).

* cited by examiner

CONTENT CREATION USING ELECTRONIC INPUT DEVICE ON NON-ELECTRONIC SURFACES

CROSS REFERENCE TO RELATED APPLICATION

This application claims the benefit under 35 USC 119(e) of U.S. Patent Application No. 62/363,172, filed Jul. 15, 2016, the contents of which are incorporated herein by reference in their entirety for all purposes.

FIELD

This relates generally to input devices and, more specifically, to creating content using an electronic input device on non-electronic surfaces.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision of stylus input. However, such styli require a touch-sensitive surface in order to generate content.

SUMMARY

This relates to generation of content using an input device without a touch-sensitive surface. In some examples, touch-down and lift-off on a non-touch-sensitive surface can be monitored by a force sensor of the input device. The position and/or motion of the input device can be tracked according to various methods including one or more of a motion and orientation sensor, a camera, or an electromagnetic- or sound-based triangulation scheme. The force data and position/motion data can be processed to generate content, including textual character input and three-dimensional objects. In some examples, the content can be generated based on tracking position and/or motion of the input device without requiring contact with a surface.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

In conventional systems including a touch-sensitive surface (e.g., touch screen or touch sensor panel), content generation using an input device, such as an active stylus, can be based on a detected path between a touch-down location and a lift-off location. This relates to generation of content using an input device without a touch-sensitive surface. In some examples, touch-down and lift-off on a non-touch-sensitive surface can be monitored by a force sensor of the input device. The position and/or motion of the input device can be tracked according to various methods including one or more of a motion and orientation sensor, a camera, or an electromagnetic- or sound-based triangulation scheme. The force data and position/motion data can be processed to generate content, including textual character input and three-dimensional objects. In some examples, the content can be generated based on tracking position and/or motion of the input device without requiring contact with a surface.

Figure 1A:
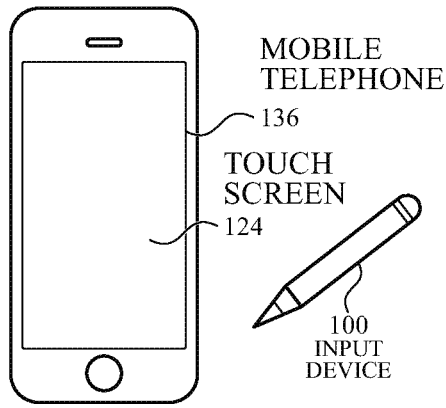
FIGS. 1A-1E illustrate examples of systems with touch screens that can accept input from an input device, such as an active stylus, via a touch-sensitive surface or via a non-touch-sensitive surface according to examples of the disclosure.
Figure 1B:
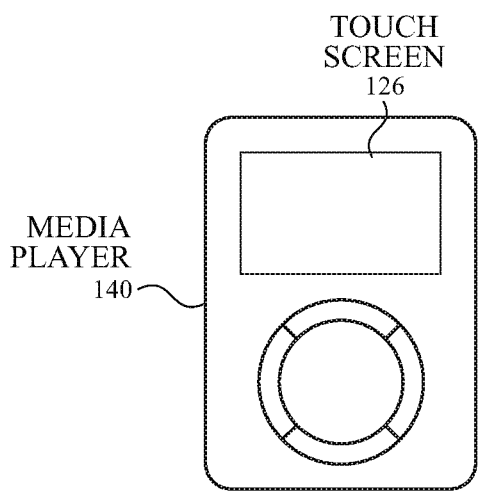
Figure 1C:
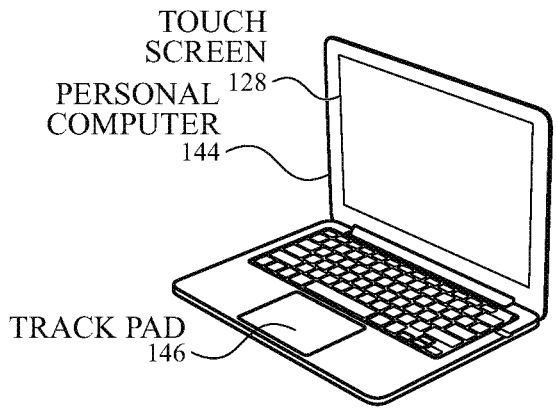
Figure 1D:
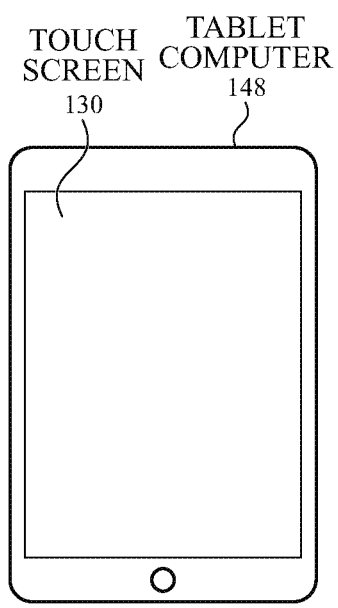
Figure 1E:
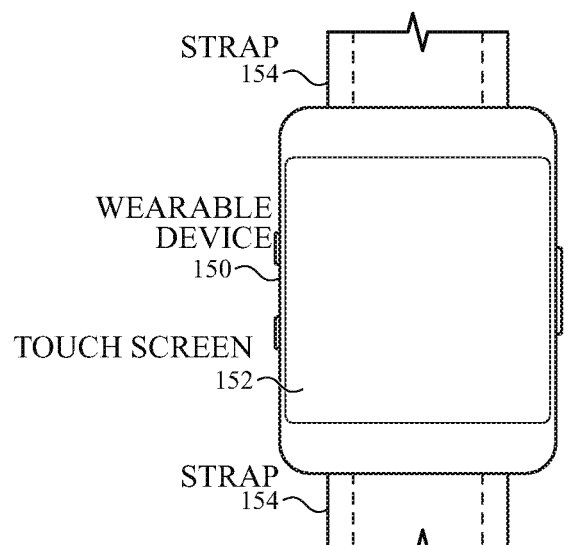

FIGS. 1A-1E illustrate examples of systems with touch screens that can accept input from an input device, such as an active stylus, via a touch-sensitive surface or via a non-touch-sensitive surface according to examples of the disclosure. FIG. 1A illustrates an exemplary mobile telephone 136 that includes a touch screen 124 that can accept input from an input device, such as an active stylus, via a touch-sensitive surface (e.g., touch screen 124) or via a non-touch-sensitive surface according to examples of the disclosure. FIG. 1B illustrates an example digital media player 140 that includes a touch screen 126 that can accept input from an input device, such as an active stylus, via a touch-sensitive surface (e.g., touch screen 126) or via a non-touch-sensitive surface according to examples of the disclosure. FIG. 1C illustrates an example personal computer 144 that includes a touch screen 128 that can accept input from an input device, such as an active stylus, via a touch-sensitive surface (e.g., touch screen 128) or via a non-touch-sensitive surface according to examples of the disclosure. FIG. 1D illustrates an example tablet computing device 148 that includes a touch screen 130 that can accept input from an input device, such as an active stylus, via a touch-sensitive surface (e.g., touch screen 130) or via a non-touch-sensitive surface according to examples of the disclosure. FIG. 1E illustrates an example wearable device 150 (e.g., a watch) that includes a touch screen 152 that can accept input from an input device, such as an active stylus, via a touch-sensitive surface (e.g., touch screen 152) or via a non-touch-sensitive surface according to examples of the disclosure. Wearable device 150 can be coupled to a user via strap 154 or any other suitable fastener. It should be understood that the example devices illustrated in FIGS. 1A-1E are provided by way of example, and other devices can accept input from an input device, such as an active stylus, via a touch-sensitive surface or via a non-touch-sensitive surface according to examples of the disclosure. Additionally, although the devices illustrated in FIGS. 1A-1E include touch screens, in some examples, the devices may have a non-touch sensitive display. As described in more detail below, the input device and computing device can include additional input/output (IO) capabilities to enable input from the input device via a non-touch-sensitive surface.

Touch screens 124, 126, 128, 130 and 152 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
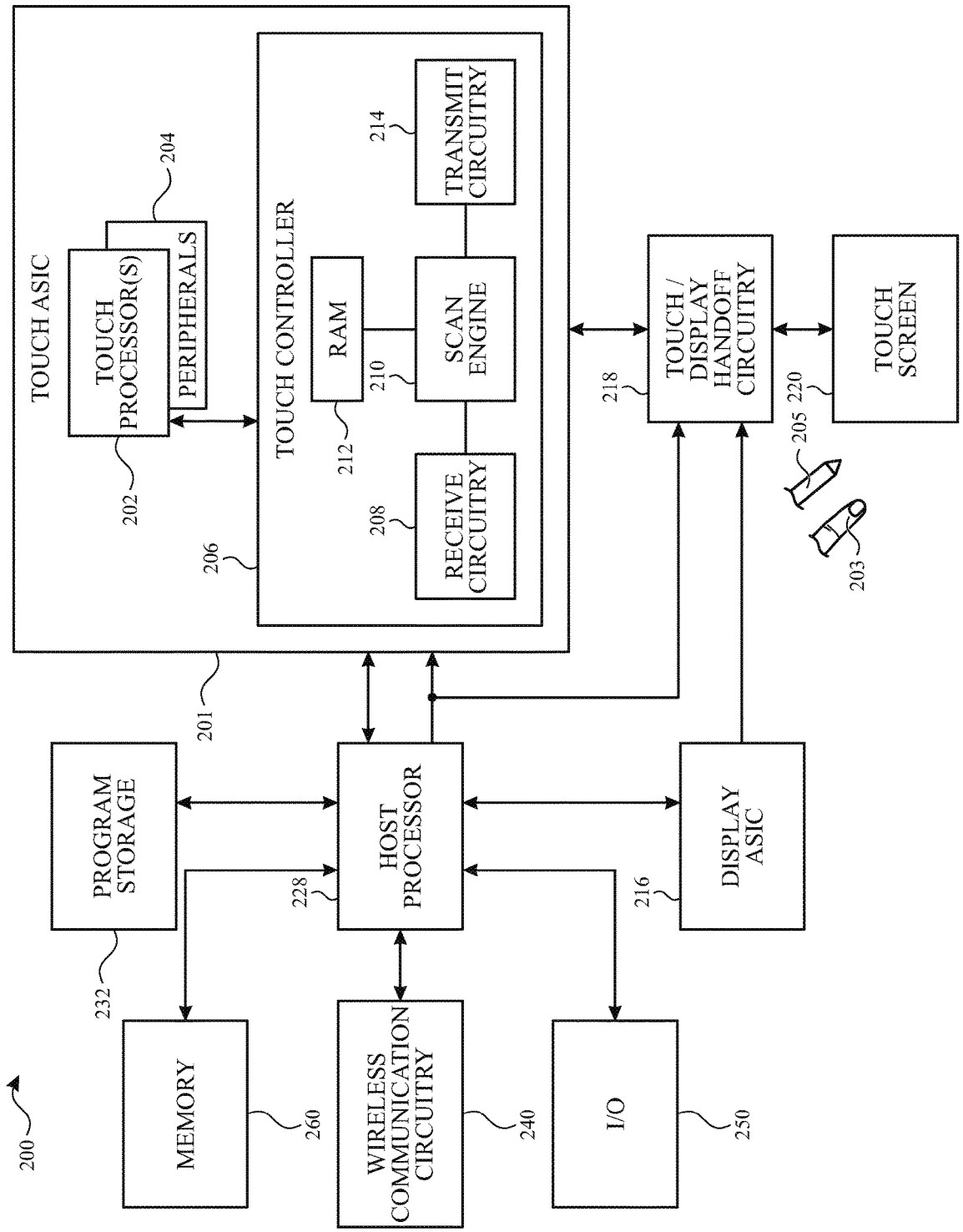
FIG. 2 illustrates a block diagram of an example computing system that can receive input from an input device, such as an active stylus, according to examples of the disclosure.

FIG. 2 illustrates a block diagram of an example computing system 200 that can receive input from an input device, such as an active stylus, according to examples of the disclosure. Computing system 200 could be included in, for example, mobile telephone 136, digital media player 140, personal computer 144, tablet computing device 148, wearable device 150, or any mobile or non-mobile computing device that includes a display. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations for touch screen 220. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a display pixel clock that can indicate transmission of a display pixel. The data signals can include color signals (e.g., red, green, blue). The display ASIC 216 can control the touch screen 220 in real-time, providing the data indicating the display pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff circuitry 218 can also be included in computing system 200. Handoff circuitry 218 can be coupled to the touch ASIC 201, display ASIC 216, and touch screen 220, and can be configured to interface the touch ASIC 201 and display ASIC 216 with touch screen 220. The handoff circuitry 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff circuitry 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff circuitry 218 to properly perform sensing and display functions for an in-cell touch screen. The synchronization signals can be communicated directly from the host processor 228 to one or more of the display ASIC 216, touch ASIC 201 and handoff circuitry 218. Alternatively, the synchronization signals can be communicated indirectly (e.g., touch ASIC 201 or handoff circuitry 218 can receive the synchronization signals via the display ASIC 216).

Computing system 200 can also include wireless communication circuitry 240. The wireless communication circuitry 240 can implement a wireless communication standard such as a WiFi®, BLUETOOTH™ or the like. The wireless communication circuitry 240 can be coupled to host processor 228 (as illustrated) and/or the touch ASIC 201. The touch ASIC 201 and/or host processor 228 can, for example, transmit scan plan information, timing information, and/or frequency information to the wireless communication circuitry 240 to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless communication circuitry 240 can also receive information from peripheral input devices, such as an active stylus 205, which can be transmitted to the touch ASIC 201 and/or host processor 228. In other examples, the wireless communication functionality can be incorporated in other components of computing system 200, rather than in a dedicated circuit.

As described herein, in some examples, in addition to or as an alternative to accepting input device input at touch screen 220, the computing system 200 can include further circuitry to enable the collection of information/data and generation of content from an input device, such as an active stylus, on a non-electronic or non-touch-sensitive surface. For example, computing system 200 can include input/output circuitry (I/O circuitry) 250 to detect information about the peripheral input device. For example, I/O circuitry 250 can include one or more transceivers, receivers or transmitters for tracking information about the input device (e.g., position, motion, orientation, etc. of the input device). For example, the I/O circuitry can include one or more electromagnetic or acoustic receivers for triangulating a position of an input device, such as the position of the input device (e.g., position of the stylus tip). Addition information about the input device (e.g., position, motion, orientation, force) can be transferred from the input device to the computing system via wireless communication circuitry 240. The information from the I/O circuitry 250 and wireless communication circuitry 240 can be stored in memory 260. The stored information can be processed by host processor 328 to render and/or display content on the display. In some examples, the information about the input device can be gathered by, transferred to, processed by and/or stored on the input device. The information can then be transferred to, processed by, and/or stored on a computing device to render and/or display the content on the display.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
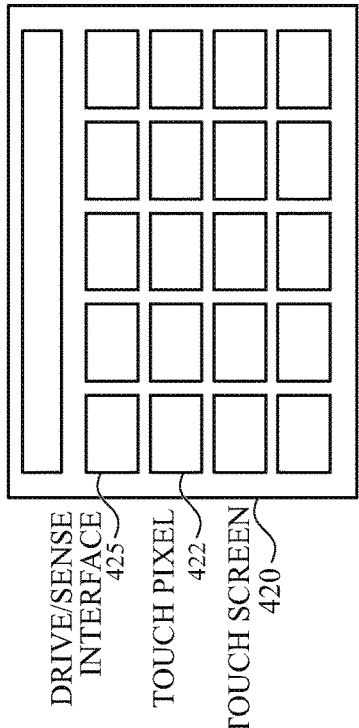
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels of receive circuitry 208 (also referred to as an event detection and demodulation circuit) in touch controller 206.

In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
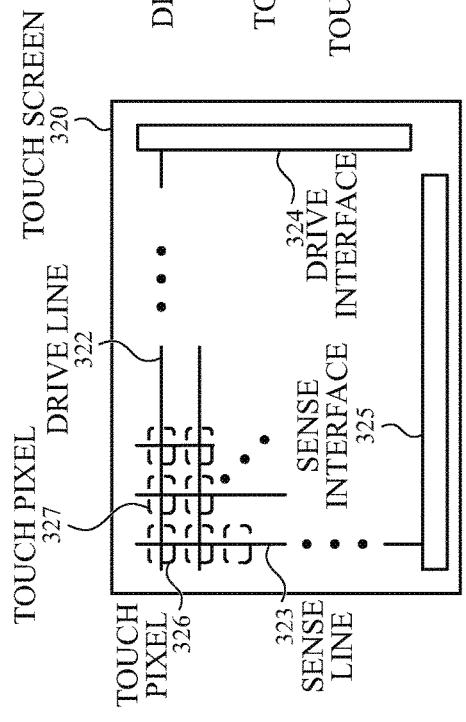
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

Figure 5:
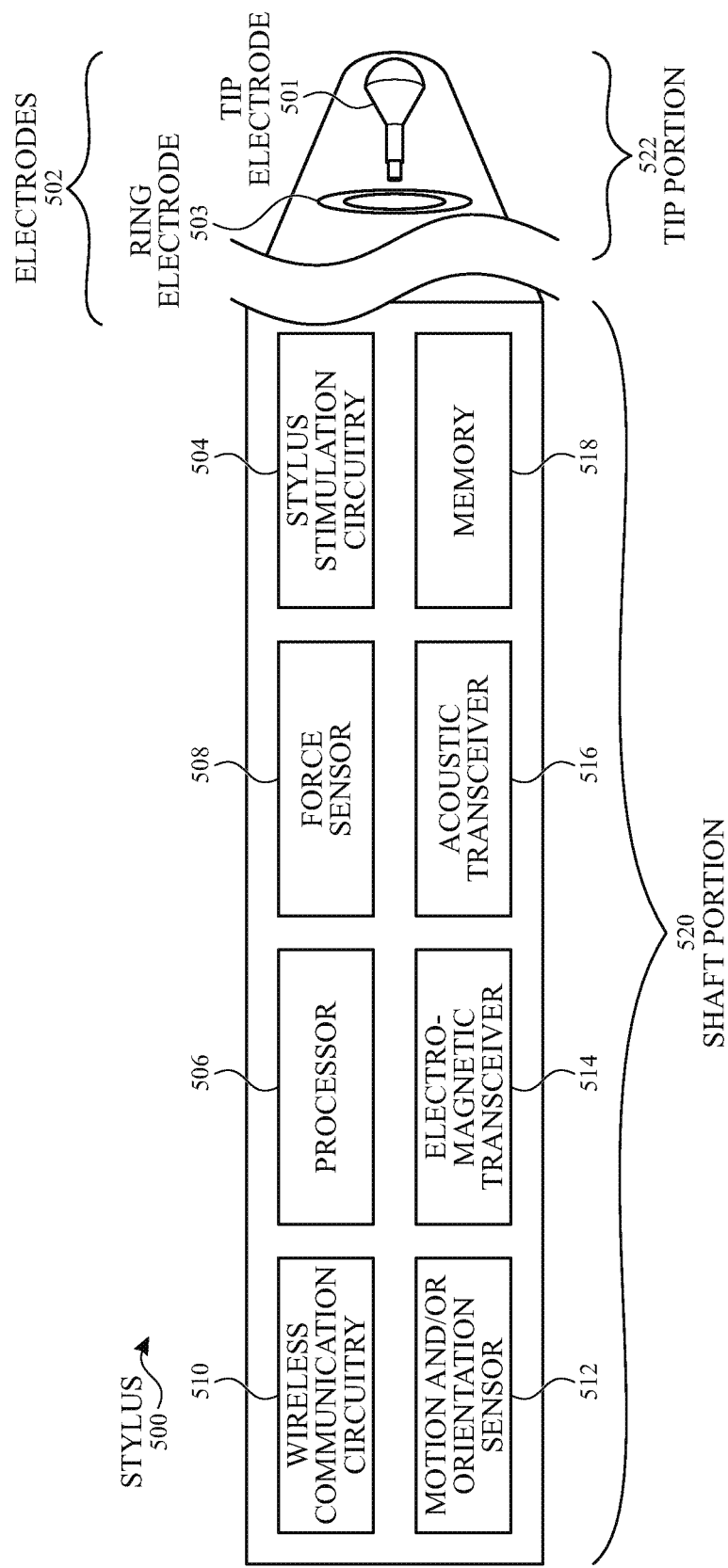
FIG. 5 illustrates an example active stylus according to examples of the disclosure.

As described herein, in addition to performing touch scans to detect an object such as a finger or a passive stylus touching or proximate to touch screen 220, computing system 200 can also perform input device scans to detect and communicate with an input device touching or proximate to touch screen 220. For example stylus scans can be performed to detect an active stylus and can communicate with the active stylus. For example, an active stylus can be used as an input device on the surface of a touch screen of touch-sensitive device. FIG. 5 illustrates an example active stylus according to examples of the disclosure. Stylus 500 can include one or more electrodes 502, which can be located, for example, at a distal end of the stylus (e.g., the tip of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like.

Stylus 500 can also include stylus stimulation circuitry 504. Stylus stimulation circuitry 504 can be configured to generate one or more stylus stimulation signals at the one or more electrodes 502 to stimulate a touch sensor panel of a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220.

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. In some examples, one or more of the stylus functions described herein can be performed by firmware stored in memory or in program storage (not shown) and executed by processor 506 or a processor in stylus stimulation circuitry 504.

In some examples, stylus 500 can also include a force sensor 508 to detect the amount of force at the tip of the stylus 500. For example, when the stylus tip is touching touch screen 220, the force sensor 508 can measure the force at the stylus tip. The force information can be stored in the stylus (e.g., in memory 518) and/or transmitted (via a wired connection or wirelessly) to the computing system 200. For example, the force information can be communicated to host processor 228 or touch ASIC 201 in computing system 200. Force information and corresponding location information can be processed together by host processor 228 and/or touch ASIC 201.

In some examples, force sensor 508 can be coupled to processor 506. Processor 506 can process force information from force sensor 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level).

Stylus 500 can also include wireless communication circuitry 510, although in some examples the wireless communication functionality can be incorporated into other components within the stylus 500, and in other examples the stylus can communicate via a wired connection. Wireless communication circuitry 510 can transmit the force information (or other information, such as motion and orientation information) from the stylus 500 to the wireless communication circuitry 540 of computing system 200. The wireless communication circuitry 510 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 500, and stylus stimulation circuitry 504 can generate stimulation signals at electrodes 502 based on, or at, the one or more low noise frequencies. In some examples, the stylus stimulation circuitry 504 can generate stimulation signals at two or more different frequencies (e.g., at one frequency at the ring electrode and at a second frequency at the tip electrode), though in other examples, stimulation signals are only generated by the stylus at one frequency. In some examples, information, such as information about stylus stimulation frequencies and scan event plans, can be transmitted from touch ASIC 201 to the wireless communication circuitry of computing system 200 via host processor 228. In other examples, information, such as clock synchronization information, can be communicated directly from touch ASIC 201 to wireless communication circuitry of computing system 200.

In some examples, stylus 500 can operate asynchronously from the computing system 200. In an asynchronous example, the stylus can continuously generate stimulation signals, generate stimulation signals at various intervals, or generate stimulation signals when force is detected by the force sensor 508. In other examples, wireless communication can be used to synchronize the stylus 500 and computing system 200. For example, the stylus 500 can receive clock synchronization information and scan plans from computing system 200 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the computing system 200 is not expecting stylus stimulation signals, the stylus can stop generating stimulation signals. Additionally, in some examples, the computing system 200 and stylus 500 can synchronize their communication to regular time intervals such that both the computing system 200 and stylus 500 can save power. For example, after the stylus and computing system pair via a wireless communication channel, the communication between the stylus and computing system can occur only at specified times (based on their respective synchronized clocks). Stylus 500 and/or computing system 200 can include one or more crystals to generate stable and accurate clock signals to improve synchronization and reduce drift between the computing system and stylus clocks.

Figure 6:
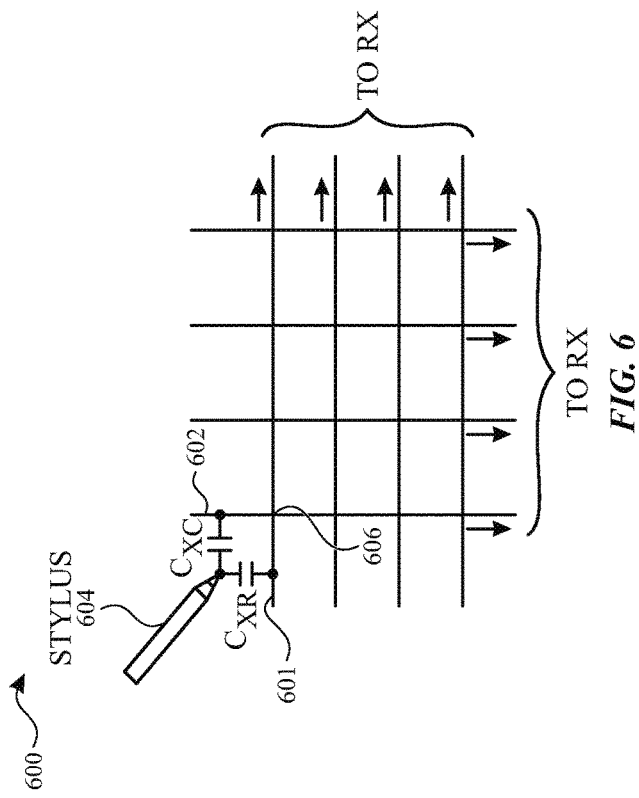
FIG. 6 illustrates an example touch sensor panel configuration operable with the touch ASIC of FIG. 2 to perform a stylus scan according to examples of the disclosure.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit circuitry 214 can be disabled, i.e., no stimulation signals Vstim from the touch controller are sent to touch sensor panel 600. The capacitive coupling (e.g., mutual capacitance) can be received by the receive circuitry 208 from the row and column traces of the one or more touch nodes 606 for processing. As described herein, in some examples the one or more stylus stimulation signals can have one or more frequencies. The one or more frequencies can be selected by the touch ASIC 201 using information from a stylus spectral analysis scan (described below in more detail). This frequency information can be wirelessly communicated to the stylus 604 so that the stylus 604 can generate stimulation signals at the appropriate frequencies.

In some examples, one or more multiplexers can be used to couple row and/or column electrodes to the receive circuitry and/or transmit circuitry. For example, during a mutual capacitance touch sensing scan, row traces can be coupled to the transmit circuitry and column traces can be coupled to the receive circuitry. During a stylus sensing scan, column traces (or row traces) can be coupled via the one or more multiplexers to the receive circuitry to detect input from a stylus or other input device along one axis of the touch screen, and then the row traces (or column traces) can be coupled via the one or more multiplexers to the receive circuitry to detect input from a stylus or other input device along a second axis of the touch screen. In some examples, the row and column traces can be sensed simultaneously (i.e., both row and column traces concurrently coupled to the receive circuitry). In some examples, the stylus can be detected on the column traces concurrently with the mutual capacitance scan touch sensing scan. The touch and stylus signals can be differentiated by filtering and demodulating the received response signals at different frequencies.

Figure 7:
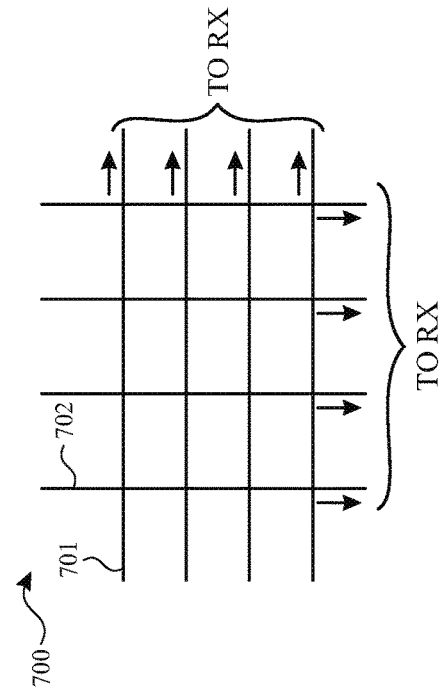
FIG. 7 illustrates an example touch sensor panel configuration operable with the touch ASIC of FIG. 2 to perform a stylus spectral analysis scan according to examples of the disclosure.

FIG. 7 illustrates an example touch sensor panel configuration operable with the touch ASIC of FIG. 2 to perform a stylus spectral analysis scan according to examples of the disclosure. During a stylus spectral analysis scan or a touch spectral analysis scan, the transmit circuitry 214 can be disabled, i.e., no stimulation signals Vstim are sent to touch sensor panel 700, while some or all of the row traces 701 and column traces 702 can be coupled to the receive circuitry 208. The receive circuitry 208 can receive and process touch signals from some or all of the rows and columns of the touch sensor panel 700 in order to determine one or more low noise frequencies for use during subsequent touch and/or stylus scans.

When the stylus 500 first connects or reconnects wirelessly to the computing system 200 it can receive frequency information from the computing system 200. A stylus spectral analysis scan can determine one or more clean frequencies for the stylus to use to generate one or more stimulation signals. The computing system 200 and stylus 500 can communicate (including, for example, performing a handshake between the two devices) and computing system 200 can transmit the frequency information to the stylus 500 such that the stylus knows the appropriate one or more frequencies to use to generate one or more stimulation signals.

The stylus 500 can change at least one stimulation frequency as a result of a stylus spectral analysis scan. In a synchronous system, a stylus spectral analysis scan can execute while the stylus 500 is predicted to not be generating a stimulation signal, e.g., when a stylus scan is not executing. After completing the stylus spectral analysis scan, the frequency information can be communicated wirelessly to stylus 500 and the communication can cause the stylus 500 to change the one or more stimulation frequencies. The computing system 200 can then switch the one or more frequencies used for demodulating stylus scan events when the stylus 500 has switched frequencies.

In other examples, stylus 500 can be asynchronous such that the stylus 500 can generate one or more stimulation signals at one or more stimulation frequencies irrespective of the timing of the stylus scan event. As a result, the stylus 500 can be stimulating the touch sensor panel during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the computing system 200 can assume that stylus lift-off will eventually occur and wait until lift-off to initiate a stylus spectral analysis scan. The computing system 200 can predict a lift-off condition using the results of other scans, e.g., stylus scans, or stylus force information to predict that the stylus is not on the panel, and then perform a stylus spectral analysis scan.

Referring back to FIG. 5, stylus 500 can include additional circuitry (and make use of some of the above described circuitry) to enable generation of content without a touch-sensitive surface. For example, stylus can also include one or more electromagnetic or acoustic transmitters, receivers or transceivers that can be used for triangulating a position of the stylus tip. For example, the stylus can include electromagnetic transceiver 514 and/or acoustic transceiver 516. As described herein in more detail, the stylus can generate an electromagnetic or acoustic signal that can be received by a plurality of receivers to triangulate the stylus position (and track movement) to generate content on a non-touch-sensitive surface.

Additionally or alternatively, stylus 500 can include one or more motion or orientation sensors 512. For example, the stylus can include an accelerometer and/or gyroscope to track motion and/or orientation of the stylus, which can be used to augment stylus position data when detected by a touch-sensitive surface or on a non-touch-sensitive surface, or which can be used for generation of content on a non-touch-sensitive surface. The motion and/or orientation information can be stored in memory 518 and/or transferred to the computing device via wireless communication circuitry 510. Additionally or alternatively, stylus 500 can include a camera to record images or video that can be used to determine the position of the stylus and/or track the motion of the stylus.

The electromagnetic transceiver 514 and/or acoustic transceiver 516 can be coupled to processor 506 to generate stimulation signals. For example, stimulation signals can be generated when a switch (e.g., button) is activated or whenever a threshold force or motion is detected by force sensor 508. In some examples, the stimulation signals can be disabled when the stylus is detected on the touch-sensitive surface. In some examples, the stimulation signals can be generated when content generation applications are active. In some examples, the stimulation signals can be generated irrespective of the above conditions.

It is to be understood that the stylus 500 is not limited to the components and configuration of FIG. 5, but can include other, fewer or additional components in multiple configurations according to various examples. Additionally, the components of stylus 500 can be included within a single device, or can be distributed between multiple device portions. For example, stylus 500 can include a shaft portion 520 and a tip portion 522. In some examples, stylus 500 can include a removable stylus tip portion 522, so that the tip portion can be removed and replaced when necessary or to enable different functionality. The removable tip portion 522 and shaft portion 520 can be coupled together with a connector (not shown). For example, the connector can be a threaded screw-type connector, plug-in connector, or the like. In some examples, a locking or fastening system between the removable stylus tip portion 522 and shaft portion 520 can include a fastening bar, spring fastener and a release button. The removable tip portion 522 can include one or more electrodes 502 (e.g., for stimulating a capacitive sensor panel). The remaining components can be included, as illustrated, in the shaft portion 520. It should be understood that the various components can be distributed in different ways between the shaft portion and tip portion. For example, in some examples, the removable tip portion 522 can include the acoustic or electromagnetic transceiver, so that triangulation capability for non-touch-sensitive surfaces can be provided for the stylus by replacing the tip portion 522. In some examples, the sensors used for generation of content without a touch-sensitive surface can be positioned near the tip of the stylus to enable more accurate detection of the position of the tip of the stylus. For example, if using a radiofrequency or acoustic triangulation scheme, the radiofrequency or acoustic transceiver can be placed near the stylus tip. Additionally, it should be understood that components of a stylus (or other input device) configured for content generation without a touch-sensitive surface may be implemented in an otherwise passive stylus such that components used for touch detection proximate to a touch-sensitive surface can be omitted (e.g., stylus stimulation circuitry 504).

As discussed herein, the ability to generate content using an input device without a touch-sensitive surface, can provide additional content generation capability. For example, motion of the input device can be recorded independently of the computing device so that users can generate content without a touch-sensitive device or computing device (e.g., drawing/writing in the sand, on tables, on books, on windows and on walls) and the content can then be rendered on a display in real-time or at a later time. Additionally or alternatively, the ability to generate content for a non-touch-sensitive surface can overcome limitations of touch screen area. For example, mobile telephones and wearable devices can include relatively small touch screens, which can limit the ability to write and draw on these screens.

Figure 8:
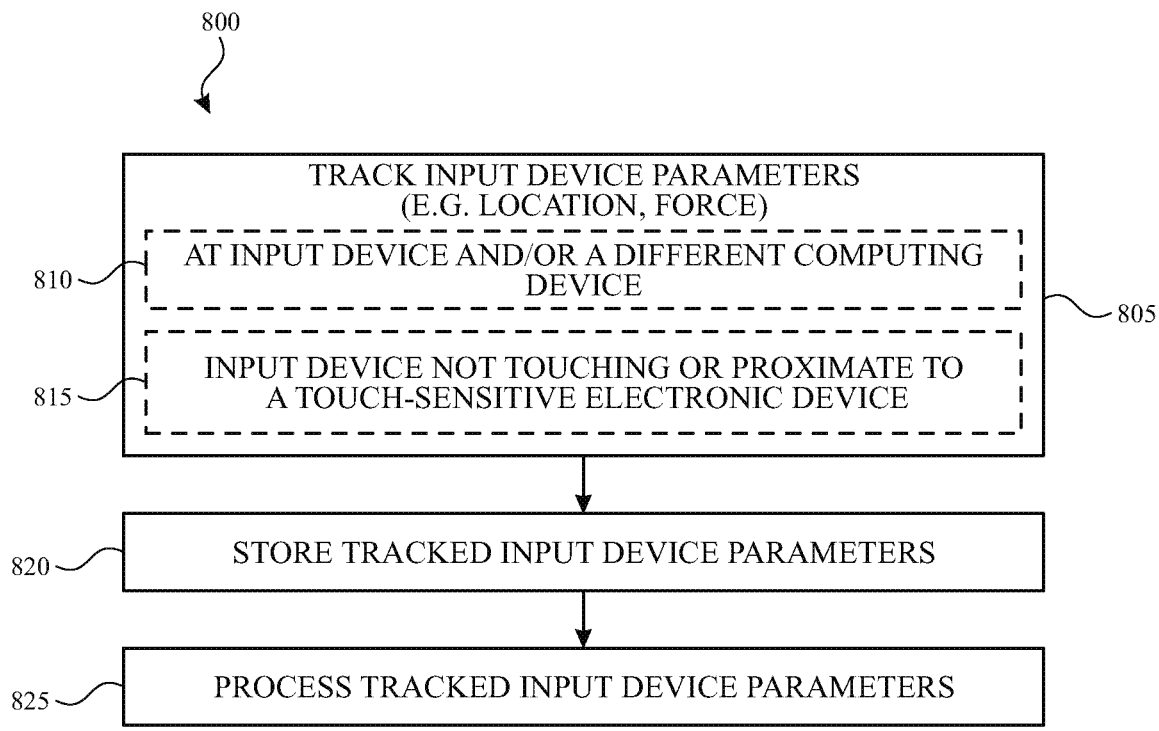
FIG. 8 illustrates an example process for generating content with an input device on a non-touch-sensitive surface according to examples of the disclosure.

FIG. 8 illustrates an example process 800 for generating content with an input device on a non-touch-sensitive surface according to examples of the disclosure. At 805, one or more parameters associated with the input device can be detected and tracked. In some examples, the one or more parameters can include a position of the input device, motion of the input device, orientation of the input device, among other parameters. The position, motion and/or orientation of the input device can be detected and tracked in a variety of ways, including but not limited to electromagnetic- or sound-based triangulation techniques, motion and orientation sensors, cameras, an encoded surface, etc. The detection and tracking can also include information such as force information or information from other sensors of the input device. Force data can represent contact between the input device and a surface in a number of different ways. For example, the force data can be represented as variable force measurements, such as raw data representative of the force applied to the tip of stylus. In some examples, the force data can be represented as a binary measurement, in which the force reports a contact force or an absence of a contact force. For example, the raw force measurement can be compared against a threshold to report contact force when the raw force measurement is above the threshold and report an absence of a contact force when the raw force measurement is below the threshold. In some example, a first threshold can be used to transition from reporting absence of contact to reporting contact and a second threshold can be used to transition from reporting contact to reporting absence of contact, where the first and second thresholds are different. The parameters associated with the input device can be detected or tracked by the input device and/or a different computing device (810). In some examples, the detection and tracking of one or more parameters can be performed when the input device is not touching or proximate to a touch-sensitive surface of a computing device (e.g., disabled when over or touching a touch screen) (815).

At 820, the parameters associated with the input device can be stored in memory in one or both of the input device and a different computing device (820). Additionally or alternatively, in some examples, the parameters can be transferred between the input device and the computing device. At 825, the tracked input device parameters can be processed to generate content. In some examples, the processed input can be rendered on the display or stored so that it can be rendered on a display.

Figure 9:
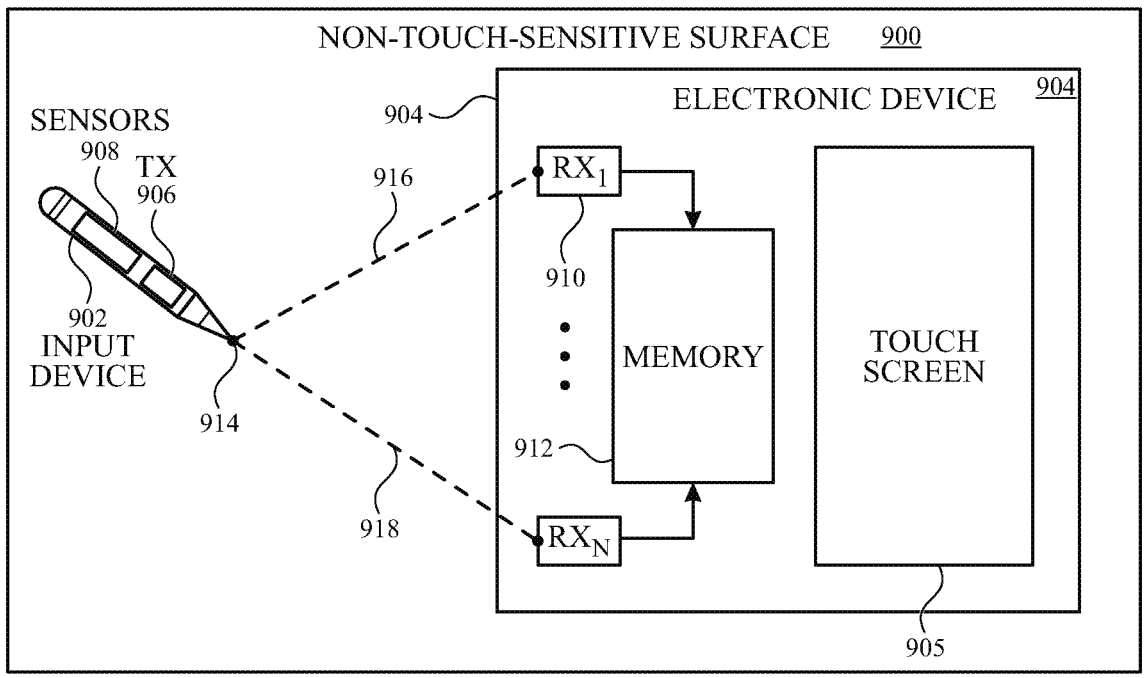
FIG. 9 illustrates an example configuration for generating content using an input device on a non-touch-sensitive surface according to examples of the disclosure.

FIG. 9 illustrates an example configuration for generating content using an input device on a non-touch-sensitive surface according to examples of the disclosure. FIG. 9 illustrates an input device 902 that can be used in contact with a non-touch-sensitive surface 900 to generate content. For example, input device 902 can be a stylus and non-touch-sensitive surface 900 can be a tabletop. Input device 902 can include a transmitter 906 and one or more sensors 908. Transmitter 906 can generate a signal that can be received by a plurality of receivers 910 ($Rx_1$-$Rx_N$) in electronic device 904 (e.g., a tablet computing device, mobile phone), which can include a display 905. For example, transmitter 906 can generate an acoustic signal, sonar signals, ultrasonic signals, radiofrequency (RF) signals (e.g., Bluetooth signals), optical signals, laser signals, or any other suitable electromagnetic or sound signal. The signals can be received by the plurality of receivers 910 (e.g., part of I/O circuitry 250) to triangulate a position of input device 902. For example, a first distance 916 can be calculated between the input device tip located at 914 and first receiver 910, and a second distance 918 can be calculated between the input device tip at 914 and second receiver 910. Additional distances can be calculated between the input device tip and additional receivers. The two or more distances can be used to triangulate the location of the input device. The distances can be calculated based on the timing of the signals (e.g., time of flight) or based on the signal strength of the signals. In the case of acoustic signals, beam forming principles can be used to determine the source of the transmitted sound.

In some examples, the receivers 910 can correspond to the microphones (for acoustic triangulation) or antennas (for RF triangulation) already incorporated into the computing device. The operation of these receivers can be modified for dual purpose use—i.e., for content generation as described herein, and for their original purpose. In some examples, RF triangulation can be used to determine location because RF triangulation can be more robust against path obstructions, whereas acoustic triangulation or optical triangulation can be degraded by path obstructions and/or sound noise in the environment.

Although illustrated in FIG. 9 with the transmitter incorporated into the input device and the receivers incorporated into an electronic device, different distributions of receiver and transmitter functionality can be used in other examples. Using the input device as the transmitter can simplify triangulation when the electronic device (and therefore its receivers) can be known to be stationary. However, in some examples, the input device can include a receiver and the electronic device can include a receiver and a transmitter, which when operated together can be used to determine the position of the input device. However, determining position of the input device in this configuration while the input device is being used to generate content, can require more complicated processing due to movement of the input device receiver.

Tracking the position of the input device can be used to generate content, as described in more detail below. The generated content can include, without limitation, text, emojis, drawings, musical notation, etc. The content can be rendered on display 905 after processing or stored in memory to be rendered or otherwise used at a different time.

Electronic device 904 can include a memory 912 to store the data gathered from receivers 910. In some examples, the memory can store raw data collected by the receivers (e.g., signal strength or timing), distances between the receivers 910 and transmitter 906, or input device coordinates based on processing the data from the various receivers. In some examples, the sensors 908 can include a force sensor configured to sense force, which can be communicated to electronic device 904, and used to associate the data from receivers with strokes by the input device, where each stroke can be defined based on the touch-down and lift-off of the input device as determined by the force data. In some examples, the data from receivers 910 can be communicated to the input device 902, stored in memory in input device 902, and force information can be used to associate receiver data with stokes at the input device. It should be understood that aside from the collection of raw data which can occur at the site of the respective sensors, the storage and/or processing of collected data can be performed at the input device or one or more computing devices, depending on the storage and processing capabilities of the input device and computing device(s) in the system.

In some examples, rather than using triangulation techniques, various sensors in the input device can be used for generation of content without a touch-sensitive surface. For example, motion and/or orientation sensors, such as accelerometers and gyroscopes can detect motion and/or orientation of the input device to determine motion and/or orientation of the input, and thereby enable the generation of content when used on a non-touch-sensitive surface. Additionally or alternatively, the input device can include a camera to record images or video that can be used to determine the position of the stylus and/or track the motion and/or orientation of the input device. For example, images recorded by the camera can be processed to detect changes in the images and thereby determine changes in position and/or motion and/or orientation. In some examples, the input device can be used with a non-touch-sensitive surface that can include encoded information that can be used to determine position. For example, an encoded paper or other encoded surface can be used. Images of the encoded surface captured by the camera (e.g. taking pictures through the tip of the stylus) can be processed and decoded to determine the position of the input device on the non-touch-sensitive surface.

It should be understood that the above examples are exemplary, and more generally, the position/location and/or motion and/or orientation can be determined as a function of one or more sensors incorporated in one or more of the input device and one or more other computing devices.

Figure 10A:
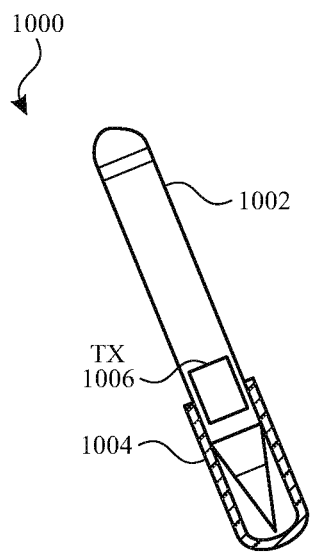
FIGS. 10A-10B illustrate an example configuration for generating content using an input device on a non-touch-sensitive surface according to examples of the disclosure.
Figure 10B:
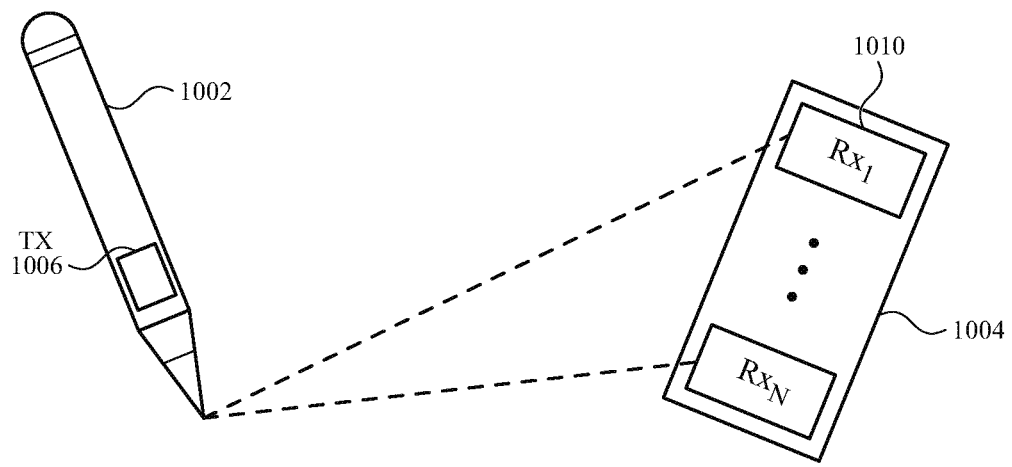

FIGS. 10A-10B illustrate an example configuration for generating content using an input device on a non-touch-sensitive surface according to examples of the disclosure. FIGS. 10A and 10B include different configuration of a two part input device 1000 such as a stylus 1002 and a cap 1004. FIG. 10A illustrates a configuration in which the stylus 1002 and cap 1004 are coupled together (e.g., similar to a conventional pen with a cap). FIG. 10B illustrates a configuration in which the stylus 1002 is decoupled from cap 1004. Stylus 1002 can include a transmitter 1006 and cap 1004 can including multiple receivers 1010 for receiving signals transmitted from the stylus 1002. The transmitter and receivers can be used to track position as described above with reference to FIG. 9. Cap 1004 can also include a memory, wireless communication circuitry and/or processor to store, transmit and/or process the data received by receivers 1010.

For example, the cap 1004 can include two or more radiofrequency receivers so that stylus 1002 can be used without an additional computing device (e.g., a smart phone or tablet). The user can for example, leave cap 1004 in the user's pocket or bag, and stylus 1002 can be used to draw or write on a nearby surface (e.g., table, window, user's body). The positional memory can be stored in the stylus and/or cap and can be later uploaded and rendered on an electronic device, such as a tablet or computer.

Figure 11:
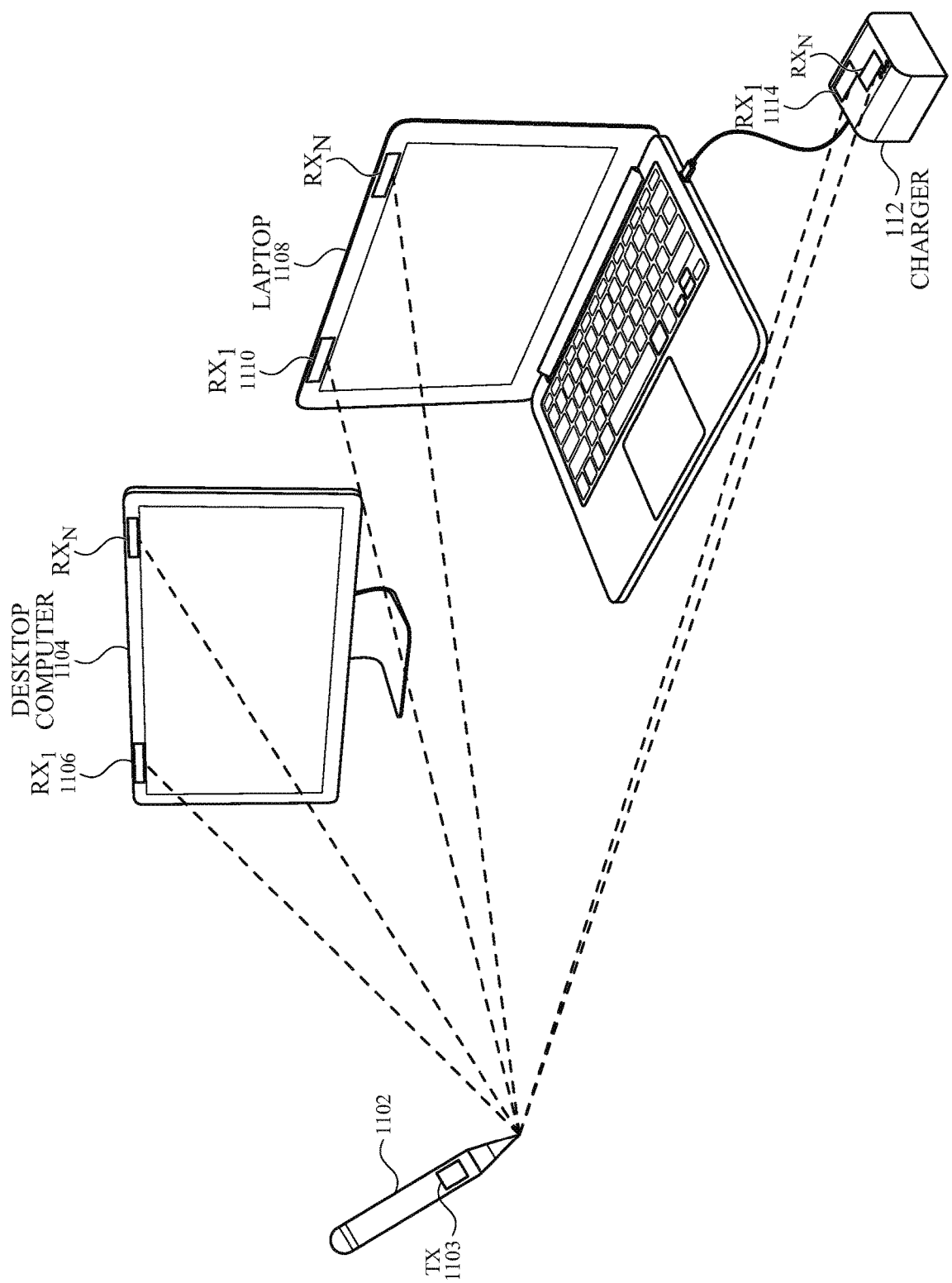
FIG. 11 illustrates another example configuration for generating content using an input device on a non-touch-sensitive surface according to examples of the disclosure.

In FIGS. 9, 10A and 10B, the input device can be used with a device (e.g., electronic device 904) or component (cap 1004) with a plurality of receivers to track the location of the input device. In some examples, one or more receivers in one or more devices can be used to track the location of the input device for content generation. FIG. 11 illustrates another example configuration for generating content using an input device on a non-touch-sensitive surface according to examples of the disclosure. An input device, such as stylus 1102, can include a transmitter 1103 which can operate like the transmitters described herein. Receivers can be included in various devices to detect and track the stylus location. For example, as illustrated in FIG. 11, the operating environment can include various devices such as desktop computer 1104, laptop computer 1108 and charger 1112. Desktop computer 1104 can include one or more receivers 1106, laptop computer 1108 can include one or more receivers 1110 and charger 1112 can include one or more receivers. The position and movement of the stylus can be tracked by one or more of the receivers in the various devices.

In some examples, each of the receivers can be used to track stylus position and the information gathered therefrom can be stored locally at each device in the environment. In some examples, the information can be transferred between devices in the environment or to one device (e.g., a master device) or the stylus 1102. The information from the receivers can be processed to track the stylus and generate content therefrom. In some examples, a subset of receivers (i.e., a number necessary for tracking) can be used. For example, when two receivers can be necessary for tracking, two receivers of a plurality of receivers in the user environment can be used to track the stylus. The receivers can be selected in a variety of ways. For example, the stylus can first pair with one or more of the devices and the receivers can be selected based on the pairing (between the input device and other devices). In some examples, the devices including receivers can be in communication with one another and the communication can be used for selection of the necessary receivers (and the subsequent storage, transmission, and/or processing of the received information). In some examples, when a sufficient number of receivers are present in the same device, the receivers can be selected from the same device, though in other examples, the receivers can be selected from different devices. Selecting receivers from the same device can minimize power, storage, transmission requirements for the generation of content.

In some examples, multiple subsets of receivers can be used to track position of the input device. To improve accuracy of tracking, different subsets of receivers can independently track position of the input device. The generation of content can be based on a comparison of the tracking by each subset. For example, when the tracked information matches (within a threshold tolerance) between two different sets of measurements, the content can be verified and either stored or rendered. However, when the tracked information does not match, the content can be discarded. In some examples, the tracking information from different subsets can be combined. For example, averages of the detected position calculated from different subsets can be used to generate content. In some examples, confidence measures can be associated with the tracking by each subset and the tracking information from the subset of receivers with higher confidence measure at a given time can be used to generate content.

Receivers can be incorporated into other electronic devices including, for example, a tablet computer or an input device cap as illustrated in FIGS. 10A-10B. Additionally or alternatively, the receivers can be included in other components or provided as dedicated receivers (e.g., a standalone sensor) in various environments. For example, receivers can be included in office buildings, conference rooms, classrooms, art studios, laboratories, public transportation stations and vehicles, airplanes and airports, commercial businesses, homes, etc.

Figure 12A:
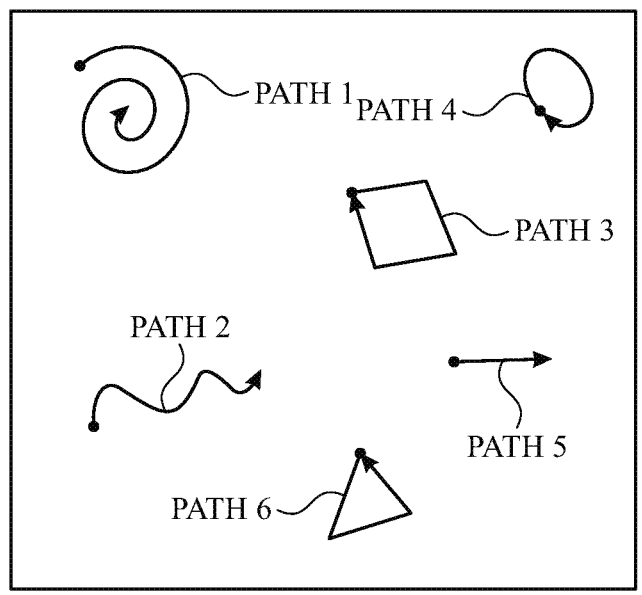
FIGS. 12A-12B illustrate examples of content created by an input device according to examples of the disclosure.
Figure 12B:
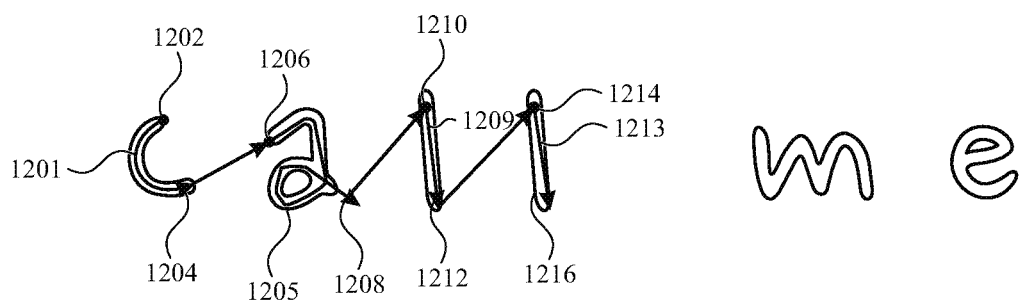

FIGS. 12A-12B illustrate examples of content created by an input device according to examples of the disclosure. FIG. 12A illustrates examples of different types of content that can be generated by corresponding strokes according to examples of the disclosure. In FIG. 12A, each stroke can begin at touch-down of the input device on a surface (illustrated by a circle) and can end at lift-off from the surface (illustrated by an arrowhead). Touch-down can be detected, for example, by at least a first threshold amount of force detected by a force sensor in the input device (e.g., force sensor 508), and lift-off can be detected for example, by less than a second threshold amount of force detected by the force sensor. The first and second thresholds can be the same or different depending on the system design. The position of the input device can be tracked, for example, based on triangulation principles discussed above, and the position of the input device between touch-down and lift-off can be associated with a stroke. In some examples, the raw data can be used to render a drawing on the display, for example, and in some examples, the raw data can be modified to render a drawing on the display.

For example, path 1 can correspond to a stroke beginning at touch-down (indicated by the circle) and ending at lift-off (indicated by the arrowhead). The position of the input device can be tracked from touch-down to lift-off to render the spiral shape. In some examples, the spiral shape can correspond to the actual measured position, and in some examples, the general spiral shape of the input of path 1 can be used to generate a geometric spiral shape without the imperfections of a human drawn spiral shape. Similarly paths 2 through path 5 illustrate other lines or shapes that can be drawn including shapes such as a circle (path 4), a polygon, such as including a square (path 3) and a triangle (path 6), or a segment, such as a linear segment (path 5) or a curved segment (path 2). These example paths are for illustration purposes, and the scope of content generation is not limited to shapes. Force information corresponding to a stroke can be used to determine opacity or line thickness associated with a stroke.

FIG. 12B illustrates example text content that can be generated by corresponding strokes according to examples of the disclosure. Strokes can be recorded and displayed as hand written text or the handwritten text can be recognized, converted and displayed according to a selected font. For example, the message "call me" can be generated on a display when an input device (whether in contact with a touch-sensitive surface or a non-touch-sensitive surface) makes the corresponding strokes. For example, a first stroke 1201 can begin at circle 1202 and end at arrowhead 1204, forming a path corresponding to the letter "c." The timing and duration of the first stroke can be determined based on force sensing capabilities of the input device. Stroke 1205 can begin at circle 1206 and end at arrowhead 1208, forming a path corresponding to the letter "a." Likewise strokes 1209 and 1213—beginning at circles 1210 and 1214, respectively, and ending at arrowheads 1212 and 1216, respectively—can form paths corresponding to the letter "l." The shape of each stroke and the relative locations of each stroke can be detected using one or more of the various tracking schemes discussed herein. Such functionality can be particularly useful for touch screen interfaces with insufficient space to include a virtual keyboard to draft text messages, for example. The text can be generated according to the position of the input device, or alternatively, the paths can be processed to generate corresponding letters according to a selected font.

In some examples, the tracked information for FIGS. 12A and 12B can include a stroke duration (e.g., time between touch-down and lift-off), a stroke shape (e.g., from tracking the location of the input device) and a relative location (e.g., to determine the relative spacing of inputs). Thus, for example, paths 1-6 drawn on a canvas with relative positions shown in FIG. 12A could be rendered on the display according to the relative position illustrated. Likewise, paths corresponding to letters written out on a non-touch-sensitive surface could be converted into messages according to the relative positions. In some examples, when inputting characters, the individual characters can be drawn in the same location, but rendered in sequence. For example, strokes 1201, 1205, 1209 and 1213 can each be drawn in the same relative location on a non-touch-sensitive surface, but because the input can be recognized as text (rather than a drawing), the different strokes can be displayed as writing a word rather than writing characters one on top of the other.

Figure 13:
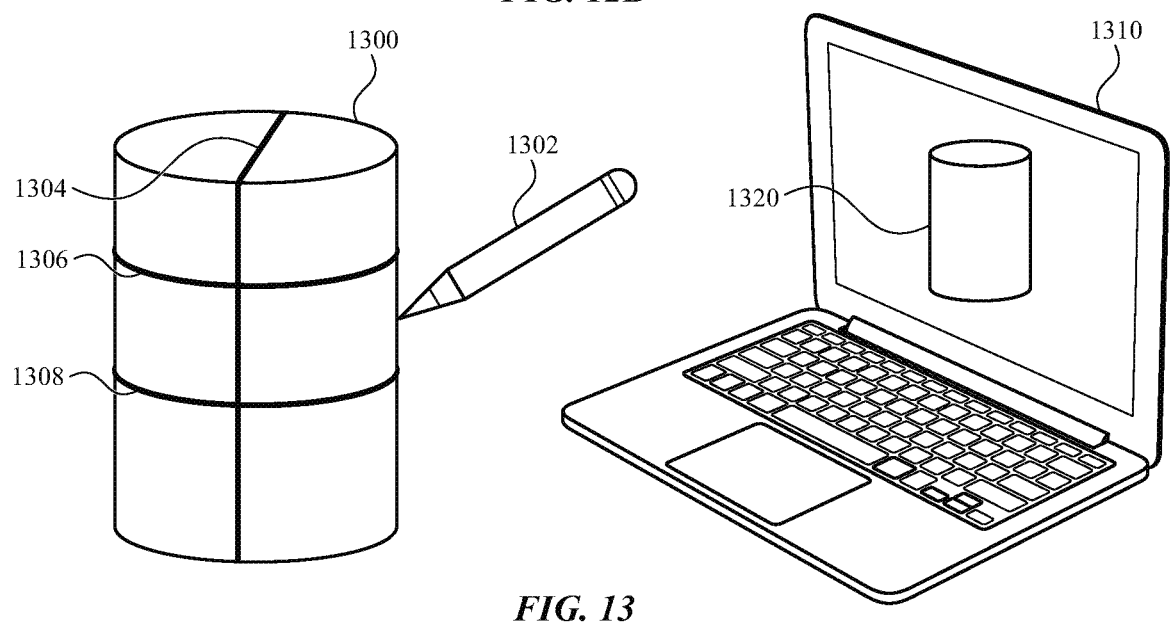
FIG. 13 illustrates an example of three-dimensional content created by an input device according to examples of the disclosure.

In some examples, the input device can be used to generate two-dimensional content (2D) or three-dimensional (3D) content. FIG. 13 illustrates an example of three-dimensional content created by an input device according to examples of the disclosure. To generate a 3D shape, such as 3D cylinder 1300, input device 1302 can trace one or more surfaces of a cylinder with one or more strokes. For example, a first stroke 1304 can trace a diameter of the top surface of cylinder 1300 and the height (along a length) of cylinder 1300. Second and third strokes 1306 and 1308 can trace the circumference of cylinder 1300. The captured 3D strokes can be used to render a 3D shape in modeling programs such as computer-aided design (CAD) software or animation software. For example, as illustrated in FIG. 13, 3D cylinder 1320 can be rendered on the display of computer 1310 based on strokes 1304, 1306 and 1308. Rendering 3D objects in this way can provide a simpler starting point for users than entering all of the dimensions manually into 3D modeling software. In some examples, the 3D tracing of objects can be used to generate models for 3D printers in a simple way.

In some examples, 2D strokes can be captured and rendered into 3D objects. For example, drawing a three-dimensional cylinder in two-dimensional space (captured as 2D strokes) can be used to render a three-dimensional cylinder on a computing device. In some examples, captured 3D strokes can be projected onto a 2D surface. For example, tracing 3D cylinder 1300 can result in capturing 3D strokes that can be used to render a 3D cylinder projected into two-dimensional space.

The number of strokes and the dimensions traced by the strokes can vary depending on the software design. For example, cylinder 1300 may only require strokes 1304 and one of strokes 1306 and 1308 to render the cylinder. In some examples, the strokes 1306 and 1308 can be collected around the circumference of the top surface and bottom surface of cylinder 1300 to render the cylinder (e.g., without stroke 1304). In some examples, additional or different combinations of strokes can be used to render different types of objects, including geometric and non-geometric shapes.

Figure 14:
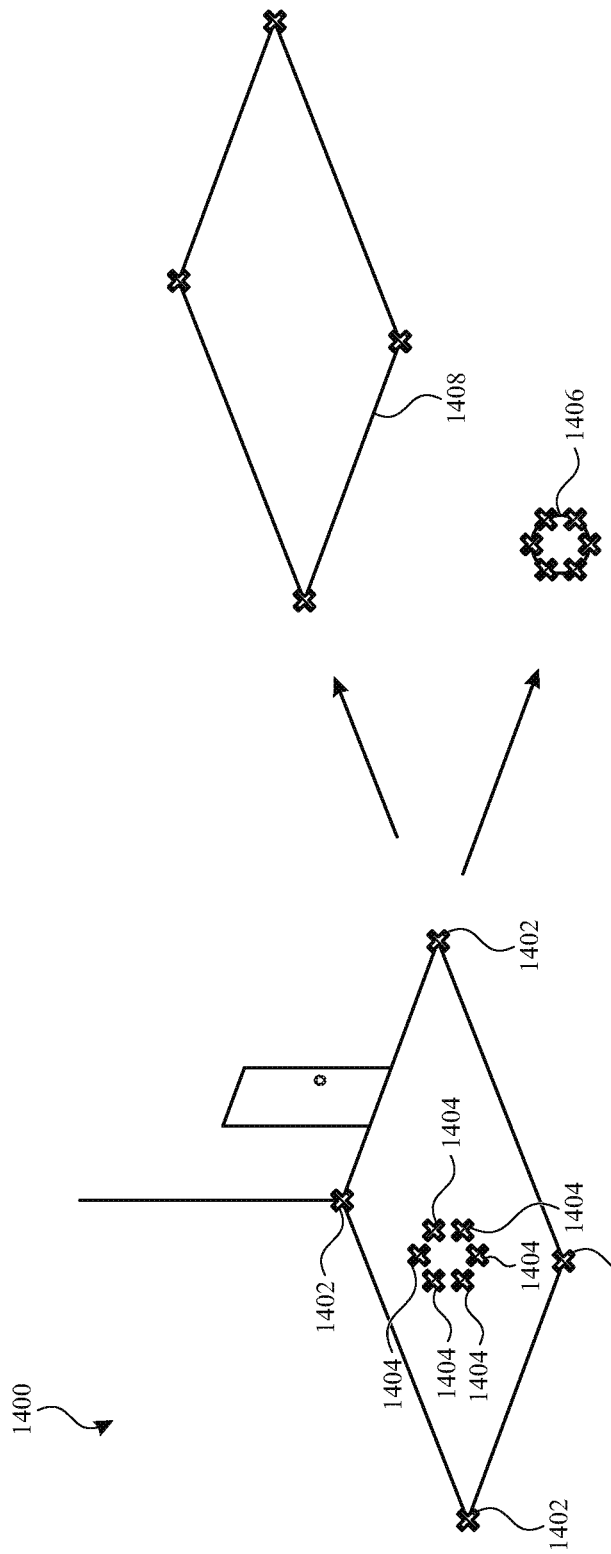
FIG. 14 illustrates another example of three-dimensional content created by an input device according to examples of the disclosure.

FIG. 14 illustrates another example of three-dimensional content created by an input device according to examples of the disclosure. For example, 2D and 3D environments can be mapped using points rather than strokes. For example environment 1400 can correspond to a room. To measure the dimensions and/or area of the room, the input device can be used to record four corners 1402 of the room (for a rectangular or square shaped room). The input stored can be used to generate a model rendering 1480 of the dimensions of the room. This content can be useful in architectural or interior design applications, for example. In some examples, the dimensions of a room and of furniture can be captured and overlaid to determine whether the furniture pieces can fit in the space available. Similarly, other 3D shapes can be rendered using the input device. For example, the input device can further be used to record the corners of the ceiling to render 3D dimensions of the room. Similarly, other 2D and 3D shapes (geometric or otherwise) can be rendered. For example, multiple point samples 1404 can be gathered with the input device and the samples can then be used to render the corresponding shape. For example, point samples 1404 in FIG. 14 can have a circular shape and can be used to render circle 1406 based on the dimensions of the measured point samples 1404. It should be understood that rather than point samples, the same shapes can be rendered by tracing.

In some examples, the captured points can be used to derive a point cloud from which the intended geometry can be derived. For example, the four points corresponding to the four corners 1402 can be used to derive a point cloud from which it can be derived that the intended geometry is a 2D rectangle. Likewise, point samples 1404 can be used to derive a point cloud from which it can be derived that the intended geometry is a 2D circle. Although 2D examples are illustrated, the same principles can be used to capture 3D point clouds to render 3D objects.

In some examples, tracing or point samples can be recorded and used to accurately measure dimensions for content. The dimensions can be used to create an electronic canvas with appropriate dimensions or can be used to scale content to fit the measured dimensions. For example, picture frame dimensions can be measured using tracing or point samples, and the dimensions can be used to scale an existing photograph to fit the frame. In some examples, the dimensions can be used to create an electronic canvas of proper dimensions so that a user can create content that will fit in the frame dimensions without requiring scaling than may distort the content. In some examples, the user can provide a scaling parameter to scale the dimensions recorded by the stylus (before or after generating and displaying the content). For example, a computerized GUI may permit actual scale drawings of a large room or building, but printing the drawing to a normal sized paper may require scaling. This scaling can be achieved based on the user provided scaling parameter, for example.

It should be noted that although often described in the context of a stylus, the examples herein can be applied to other input devices interacting with touch-sensitive and non-touch-sensitive surfaces. Additionally, although often described with regard to a touch screen, the input devices can be used with touch-sensitive or non-touch-sensitive devices that do not include a touch screen. Additionally, the sensors and capability to generate content using an input device on a non-touch-sensitive surface as described herein can be inherent to the device (e.g., sensors built into stylus 500) or achieved by an add-on. For example, in some examples the sensors can be incorporated into a replacement tip portion that can be added on to stylus 500. In some examples, the sensors can be fastened onto traditional writing implements such as a stylus, pen, pencil, paintbrush, pointer or any other suitable device. In some examples, the sensors for generating content on a non-touch-sensitive surface can be used to augment a finger or other body part. For example, the sensors can be incorporated into a glove or ring worn by a user, or the sensors can be fastened to a user's finger (e.g., with a strap or other fastener).

Although often described herein as generating content using strokes defined by contact between a stylus and a surface (touch-sensitive or not), in some examples, the content can be generated without a surface at all (e.g., based on movement of a device in the air). For example, triangulation techniques described herein can be used to track the stylus position (e.g., tip position) and the strokes can be determined based on other input than contact force. For example, a stroke can begin with actuation of a first input element (e.g., a button, toggle switch, etc.) of the input device and can terminate with actuation of the first input element or a second input element of the input device (e.g., a button, toggle switch, etc.). In some examples, the user can actuate and hold a button during stroke input and release the button to terminate the stroke. In some examples, a light sensor or capacitive sensor external to the stylus can be used to differentiate between strokes. For example, a user may pass the stylus over the external sensor between strokes to differentiate between strokes. In some examples, motion sensors within the stylus can be used to detect pauses indicative of the end of a stroke and motion indicative of the beginning of a stroke. For example, when the motion of the device exceeds a first motion threshold, the stroke can begin. When the motion of the device falls below a second motion threshold, the stroke can end. In some examples, the first and second motion thresholds can be the same. In other examples, the first and second motion thresholds can be different. In some examples, in addition to a motion threshold, a time threshold can be implemented. For example, a pause in motion for a duration above a time threshold can be necessary to stop a stroke.

Additionally, the input device and content generation described herein can be used in virtual reality or augmented reality contexts. For example, the input device (e.g., stylus or other sensor augmenting a finger or other body part) can be used to trace 2D or 3D physical surfaces or capture physical objects using point samples and the captured strokes or point samples can be used to render surfaces or objects in augmented or virtual reality displays as 2D or 3D surfaces or objects. In some examples, the captured physical content can be scaled before display in the virtual or augmented reality environment to match the relative size of objects in the virtual or augmented reality environment.

Additionally or alternatively, in some examples, the input device can be used to interact with objects displayed in the augmented or virtual reality environment. In some examples, the input device can be used as a selection or editing tool for interaction with GUI objects in a virtual or augmented reality display. For example, some or all of a computer file system can be displayed using augmented or virtual reality icons, and a user can tap or double tap (or selection means) with the input device at the location of the augmented or virtual reality icons to open or activate the icon. In some example, the input device can be used as an editing tool to modify the shape of the 3D cylinder of FIG. 13 (e.g., elongate the cylinder, change the radius of the cylinder, etc.) displayed in an augmented or virtual reality environment. In some examples, the input device can be used to capture content displayed in virtual or augmented reality environments and the content can be displayed outside the virtual reality or augmented reality environment (or in a different virtual or augmented reality environment). For example, a 2D or 3D shape or object can be captured by tracing a virtual or augmented reality object, using point samples of the virtual or augmented reality object, or otherwise selecting the virtual or augmented reality object, and the captured shape or object can be displayed on a touch screen or other display device (or other virtual or augmented reality environment), thereby extracting the virtual or augmented reality object from that environment, and placing the content into a different environment.

Therefore, according to the above, some examples of the disclosure are directed to a computing device. The computing device can comprise a display and a processor coupled to the display. The processor can be configured to generate content based on data received from a peripheral input device in contact with a non-touch-sensitive surface, and display the content generated by the processor on the display. Additionally or alternatively to one or more of the examples disclosed above, in some examples, the computing device can further comprise wireless communication circuitry coupled to the processor. The wireless communication circuitry can be configured to receive the data from the peripheral input device. The data received from the peripheral input device can comprise at least force information indicative of contact between the peripheral input device and the non-touch-sensitive surface. Additionally or alternatively to one or more of the examples disclosed above, in some examples, the computing device can further comprise a plurality of radiofrequency receivers configured to receive radiofrequency signals transmitted from the peripheral input device. The processor can be further configured to triangulate the position of the peripheral input device based on the received radiofrequency signals and generate the content based on the triangulated position of the peripheral input device. Additionally or alternatively to one or more of the examples disclosed above, in some examples, the computing device can further comprise a plurality of acoustic receivers configured to receive acoustic signals transmitted from the peripheral input device. The processor can be further configured to triangulate the position of the peripheral input device based on the received acoustic signals and generate the content based on the triangulated position of the peripheral input device. Additionally or alternatively to one or more of the examples disclosed above, in some examples, the processor can be further configured to identify one or more strokes based on the data received from the peripheral input device. A stroke duration can correspond to a continuous interval in which detected force at the peripheral input device exceeds a threshold. Additionally or alternatively to one or more of the examples disclosed above, in some examples, the one or more identified strokes can include at least one three-dimensional stroke. Additionally or alternatively to one or more of the examples disclosed above, in some examples, the processor can be further configured to derive a point cloud from the one or more identified strokes. Additionally or alternatively to one or more of the examples disclosed above, in some examples, the processor can be further configured to render a two-dimensional or three-dimensional object based on the one or more two-dimensional or three-dimensional strokes. Additionally or alternatively to one or more of the examples disclosed above, in some examples, the processor can be further configured to render one or more characters based on the one or more identified strokes. Additionally or alternatively to one or more of the examples disclosed above, in some examples, the processor can be further configured to generate the content according to dimensions derived from the one or more strokes. Additionally or alternatively to one or more of the examples disclosed above, in some examples, the processor can be further configured to generate the content according to the dimensions derived from the one or more strokes and according to a scaling parameter.

Some examples of the disclosure are directed to an input device. The input device can comprise a force sensor configured to detect force data indicative of contact between the input device and a non-touch-sensitive surface, a transmitter configured to generate triangulation signals, and a processor coupled to the force sensor and the transmitter, the processor configured to generate a plurality of strokes based on the force data and triangulated position of the input device. Additionally or alternatively to one or more of the examples disclosed above, in some examples, the transmitter can be configured to generate acoustic signals. Additionally or alternatively to one or more of the examples disclosed above, in some examples, the transmitter can be configured to generate radiofrequency signals. Additionally or alternatively to one or more of the examples disclosed above, in some examples, the input device can further comprise a memory coupled to the processor and configured to store the strokes generated by the processor. Additionally or alternatively to one or more of the examples disclosed above, in some examples, the input device can further comprise a motion or orientation sensor configured to detect motion or orientation data tracking the input device. The processor can be further configured to generate the plurality of strokes based on the motion or orientation data from the motion or orientation sensor. Additionally or alternatively to one or more of the examples disclosed above, in some examples, the input device can further comprise a camera configured to detect position or motion data of the input device. The processor is further configured to generate the plurality of strokes based on position or motion data from the camera. Additionally or alternatively to one or more of the examples disclosed above, in some examples, the input device can further comprise a cap configurable to be separated from or attached to the input device. The cap can comprise a plurality of receivers configured to receive the triangulation signals.

Some examples of the disclosure are directed to a method. The method can comprise: tracking a position of an input device and generating content based on the tracked position while the input device is in contact with a non-touch-sensitive surface. Additionally or alternatively to one or more of the examples disclosed above, in some examples, the method can further comprise detecting force between the input device and the non-touch-sensitive surface. The content can be further generated based on the detected force. Additionally or alternatively to one or more of the examples disclosed above, in some examples, the method can further comprise identifying one or more strokes based on the tracked position of the input device and the detected force. A stroke can begin when the detected force meets a first force threshold and can end when the detected force does not meet a second force threshold. Additionally or alternatively to one or more of the examples disclosed above, in some examples, the method can further comprise rendering a three-dimensional object or one or more characters based on the one or more strokes. Additionally or alternatively to one or more of the examples disclosed above, in some examples, tracking the position of the input device can comprise generating a triangulation signal, receiving the triangulation signal at a plurality of receivers, and determining a location of the input device based on the received triangulation signals. Additionally or alternatively to one or more of the examples disclosed above, in some examples, the triangulation signal can be a radiofrequency signal. Additionally or alternatively to one or more of the examples disclosed above, in some examples, the triangulation signal can be an acoustic signal. Some examples of the disclosure are directed to a non-transitory computer readable storage medium. The non-transitory computer readable storage medium can store one or more programs, the one or more programs comprising instructions, which when executed by a device including one or more processors, can cause the device to perform any of the above methods.

Some examples of the disclosure are directed to a computing device. The computing device can comprise a display and a processor coupled to the display. The processor configured to generate content based on data received from a peripheral input device not in contact with a surface and display the content generated by the processor on the display.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An input device comprising:
   a force sensor configured to detect force data indicative of contact between the input device and a surface;
   a transmitter configured to:
   generate triangulation signals while the input device contacts a non-touch sensitive surface; and
   forgo generating the triangulation signals while the input device is detected in contact with a touch-sensitive surface, wherein the input device is detected in contact with the touch-sensitive surface based on capacitive coupling between the input device and the touch-sensitive surface;
   a memory configured to store data, received from a host device in communication with the input device, generated in response to the triangulation signals generated by the transmitter; and
   a processor coupled to the force sensor, the memory and the transmitter, the processor configured to generate a plurality of strokes based on the force data and triangulated position of the input device.

2. The input device of claim 1, wherein the transmitter is configured to generate acoustic signals or radiofrequency signals.

3. The input device of claim 1, wherein the data stored in the memory comprises the strokes generated by the processor.

4. The input device of claim 1, further comprising:
   a motion or orientation sensor configured to detect motion or orientation data tracking the input device, wherein the processor is further configured to generate the plurality of strokes based on the motion or orientation data from the motion or orientation sensor.

5. The input device of claim 1, further comprising:
   a camera configured to detect position or motion data of the input device, wherein the processor is further configured to generate the plurality of strokes based on position or motion data from the camera.

6. The input device of claim 1, further comprising:
   a cap configurable to be separated from or attached to the input device, the cap comprising a plurality of receivers configured to receive the triangulation signals.

7. The input device of claim 6, wherein the cap further comprises:
   a second memory configured to store data received by the plurality of receivers;
   a second processor configured to process the data received by the plurality of receivers to estimate the triangulated position of the input device; and
   wireless communication circuitry configured to transmit the triangulated position to the input device.

8. The input device of claim 1, wherein the data stored in the memory comprises receiver data received from the host device, and wherein the processor is further configured to estimate the triangulated position of the input device based on the receiver data.

9. The input device of claim 1, wherein the data stored in the memory comprises the triangulated position of the input device.

10. The input device of claim 1, wherein the surface is a three-dimensional surface and wherein the plurality of strokes includes at least one three-dimensional stroke.

11. The input device of claim 1, the processor further configured to derive a point cloud from the plurality of strokes.

12. A method comprising:
    at an input device including a force sensor, a transmitter, a memory and a processor:
    generating triangulation signals while the input device is detected in contact with a non-touch sensitive surface,
    forgo generating triangulation signals while the input device is detected in contact with a touch-sensitive surface, wherein the input device is detected in contact with the touch-sensitive surface based on capacitive coupling between the input device and the touch-sensitive surface;
    detecting force data indicative of contact between the input device and the non-touch-sensitive surface;
    receiving, from a host device in communication with the input device, data generated in response to the triangulation signals generated by the transmitter; and
    identifying one or more strokes based on the force data and triangulated position of the input device, wherein a stroke duration corresponds to a continuous interval in which the detected force at the input device exceeds a threshold.

13. The method of claim 12, wherein the triangulation signal is a radiofrequency signal.

14. The method of claim 12, wherein the triangulation signal is an acoustic signal.

15. The method of claim 12, further comprising:
    storing the one or more strokes in the memory.

16. The method of claim 12, wherein the data comprises receiver data received from the host device, and the method further comprises:
    estimating, at the input device, the triangulated position of the input device based on the receiver data.

17. The method of claim 12, wherein the data comprises the triangulated position of the input device.

18. A non-transitory computer readable storage medium storing instructions, which when executed by an input device comprising a force sensor, a transmitter, a memory and a processor, cause the input device to perform a method comprising:
    in accordance with the input device being in contact with a non-touch sensitive surface, generating triangulation signals;
    in accordance with the input device being detected in contact with a touch-sensitive surface, forgo generating triangulation signals, wherein the input device is detected in contact with the touch-sensitive surface based on capacitive coupling between the input device and the touch-sensitive surface;
    detecting force data indicative of contact between the input device and the non-touch-sensitive surface;
    receiving, from a host device in communication with the input device, data generated in response to the triangulation signals generated by the transmitter; and
    identifying one or more strokes based on the force data and triangulated position of the input device, wherein a stroke duration corresponds to a continuous interval in which the detected force at the input device exceeds a threshold.

19. The non-transitory computer readable storage medium of claim 18, wherein the triangulation signal is a radiofrequency signal.

20. The non-transitory computer readable storage medium of claim 18, wherein the triangulation signal is an acoustic signal.

21. The non-transitory computer readable storage medium of claim 18, further comprising:
   storing the one or more strokes in the memory.

22. The non-transitory computer readable storage medium of claim 18, wherein the data comprises receiver data received from the host device, and the method further comprises:
   estimating, at the input device, the triangulated position of the input device based on the receiver data.

23. The method of claim 18, wherein the data comprises the triangulated position of the input device.

* * * * *